United States Patent
Eisenhour

(10) Patent No.: US 8,973,381 B2
(45) Date of Patent: Mar. 10, 2015

(54) VEHICLE AIR CONDITIONING SYSTEM

(75) Inventor: Ronald S. Eisenhour, West Bloomfield, MI (US)

(73) Assignee: Nissan North America, Inc., Franklin, TN (US)

( * ) Notice: Subject to any disclaimer, the term of this patent is extended or adjusted under 35 U.S.C. 154(b) by 583 days.

(21) Appl. No.: 13/360,403

(22) Filed: Jan. 27, 2012

(65) Prior Publication Data

US 2013/0192282 A1 Aug. 1, 2013

(51) Int. Cl.
F25D 21/00 (2006.01)

(52) U.S. Cl.
USPC .............................. 62/150; 62/228.1; 62/272

(58) Field of Classification Search
CPC .... B60H 1/3207; B60H 3/0085; F24F 13/222
USPC ................. 62/128, 140, 150, 228.1, 272, 277
See application file for complete search history.

(56) References Cited

U.S. PATENT DOCUMENTS

| | | | |
|---|---|---|---|
| 2001/0049943 A1* | 12/2001 | Nakamura et al. | 62/176.6 |
| 2008/0173437 A1 | 7/2008 | Yelles | |
| 2010/0031680 A1* | 2/2010 | Eisenhour et al. | 62/176.1 |

* cited by examiner

*Primary Examiner* — Jonathan Bradford
(74) *Attorney, Agent, or Firm* — Global IP Counselors, LLP

(57) ABSTRACT

A vehicle air conditioning system includes a compressor, a condenser, an evaporator and a controller. The controller is operatively coupled to the compressor to manage operation of the compressor during a cooling operation that provides temperature reduction of air flowing across heat transferring portions of the evaporator. The controller further manages operation of the compressor in a moisture releasing operation in response to termination of the cooling operation. The moisture releasing operation includes, for example, finite operation of the compressor that retards release of moisture from the heat transferring portions of the evaporator.

20 Claims, 10 Drawing Sheets

VEHICLE AIR CONDITIONING SYSTEM

BACKGROUND

1. Field of the Invention

The present invention generally relates to a vehicle air conditioning system. More specifically, the present invention relates to an air conditioning system configured to retard the release of moisture into a passenger compartment of the vehicle after termination of cooling operations of the air conditioning system.

2. Background Information

A vehicle typically includes an air conditioning system in order to provide comfortable conditions within a passenger compartment of the vehicle, and clear up fogging on interior glass surfaces of the passenger compartment. The air conditioning system typically includes a compressor, a condenser, an expansion valve and an evaporator. The compressor provides compressed refrigerant to the condenser, which then dissipates heat from the compressed refrigerant. The cooled refrigerant is then expanded to a lower pressure by the expansion valve and fed to the evaporator to cool airflow passing along outer surfaces of the evaporator. The cooled airflow is then directed into the passenger compartment of the vehicle.

When the air conditioning system is operated to provide cooling to the passenger compartment of the vehicle, the reduced temperature of the evaporator typically causes moisture in the airflow to condense on the outer surfaces of the evaporator. When the cooling cycle of the air conditioning system is terminated, the condensed moisture evaporates.

If the vehicle and blower motor are still in operation when the cooling operation of the air conditioning system is terminated, the moisture condensed on the outer surfaces of the evaporator can rapidly evaporate and flow into the passenger compartment. The rapidly evaporating moisture can then condense on interior glass surfaces of the vehicle causing fogging, and can also create an uncomfortable environment for passengers as a result of the rapid increase of moisture density within the passenger compartment. Further, rapidly released moisture from the outer surfaces of the evaporator can sometimes have an unpleasant aroma that also enters the passenger compartment.

SUMMARY

One object is to provide an air conditioning system with a moisture releasing operation that retards the release of moisture after the cooling operation of the air conditioning system has been terminated.

In view of the state of the known technology, one aspect of a vehicle air conditioning system includes a compressor, a condenser, an evaporator and a controller. The compressor is configured to compress refrigerant and the condenser is fluidly coupled to the compressor to receive the refrigerant from the compressor. The evaporator is fluidly coupled to the condenser to receive the refrigerant from the condenser and fluidly coupled to the compressor to supply the refrigerant to the compressor. The controller is operatively coupled to the compressor to manage operation of the compressor during a cooling operation that provides temperature reduction of air flowing across heat transferring portions the evaporator. The controller further manages operation of the compressor in a moisture releasing operation in response to termination of the cooling operation. The moisture releasing operation includes finite operation of the compressor that retards release of moisture from the heat transferring portions of the evaporator.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
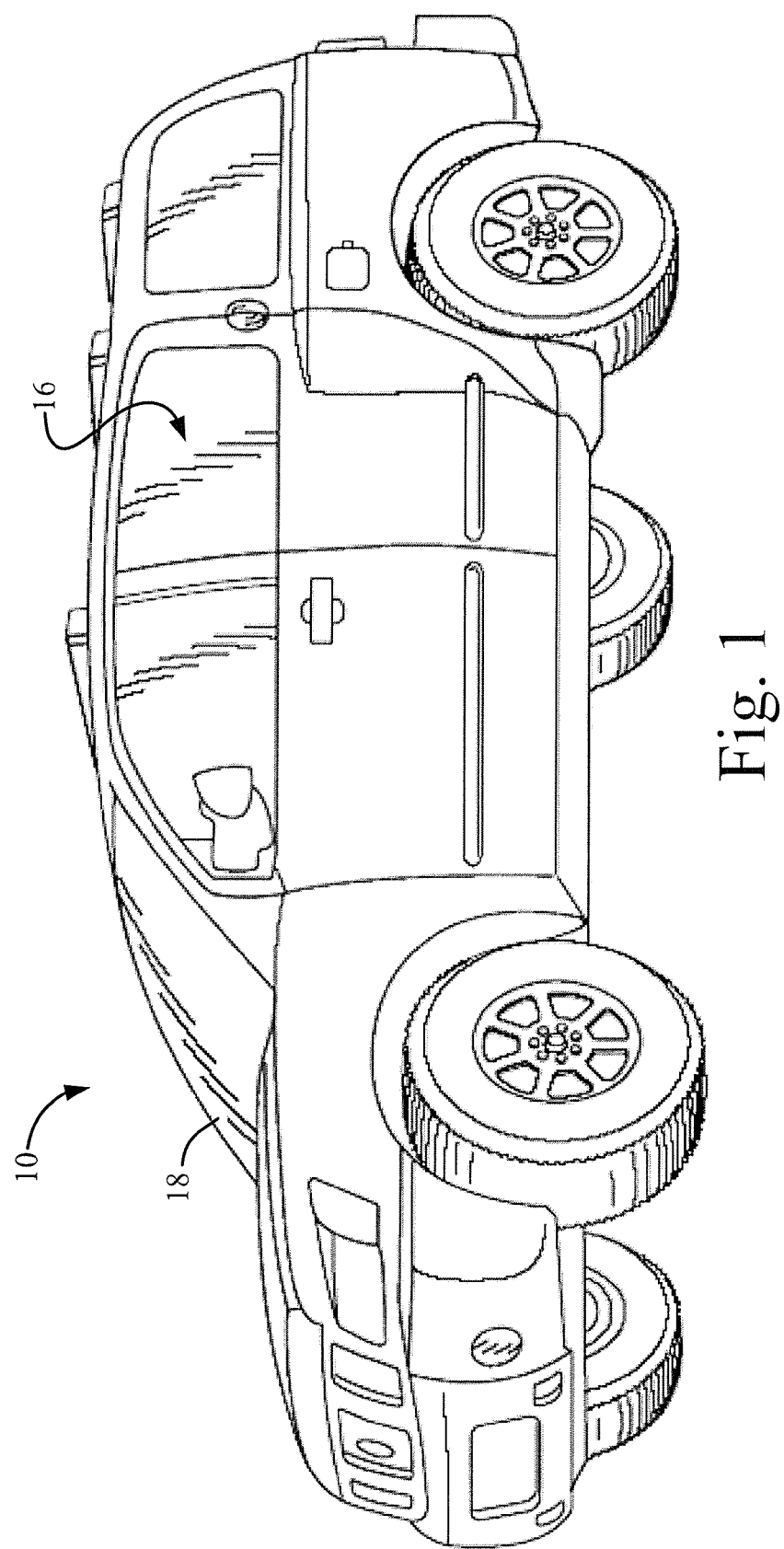
FIG. 1 is a perspective view of a vehicle that includes a passenger compartment and an air conditioning system in accordance with a first embodiment.
Figure 2:
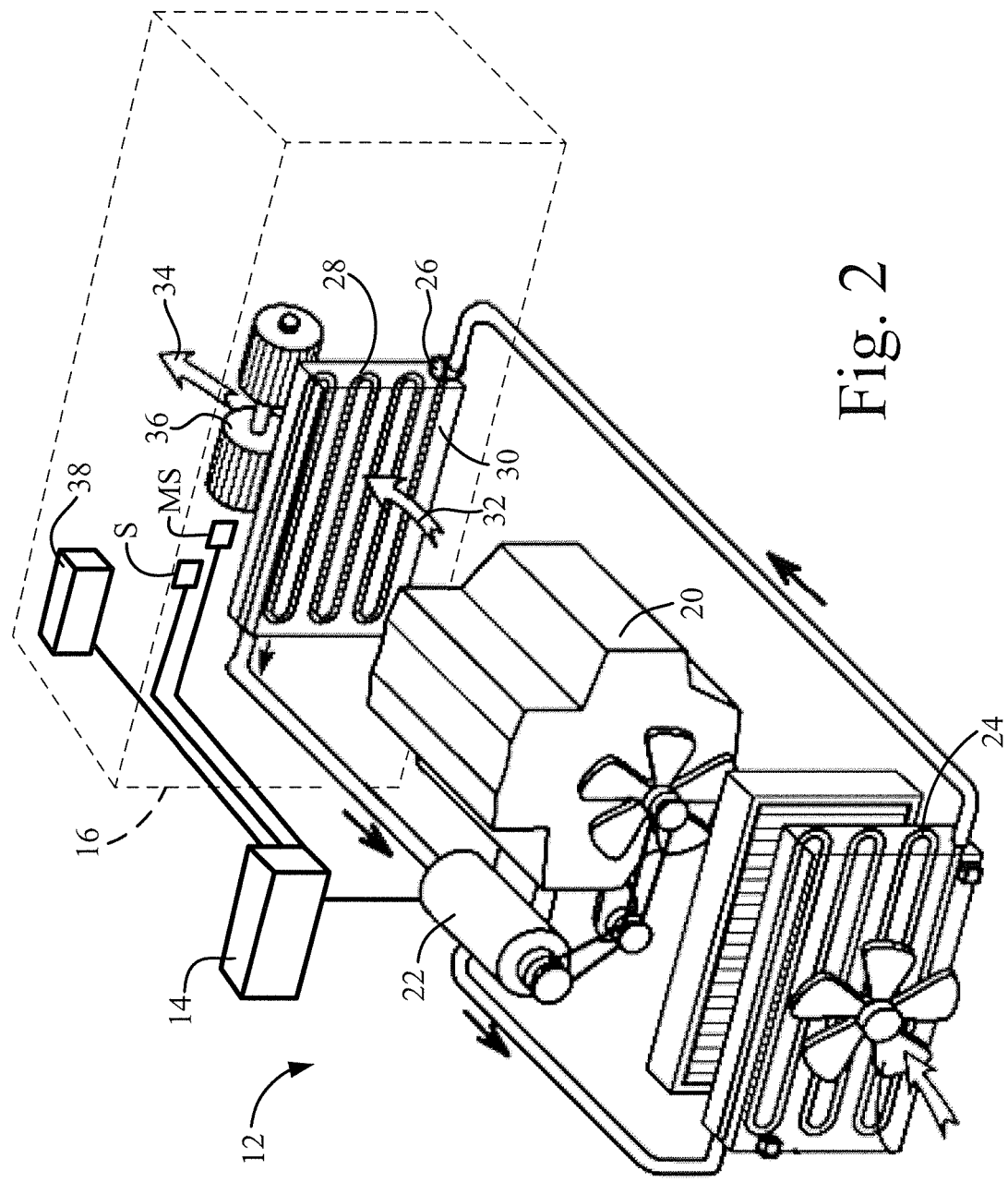
FIG. 2 is a schematic perspective view of the air conditioning system and a motor within the vehicle depicted in FIG. 1, in accordance with the first embodiment.

Referring initially to FIG. 1, a vehicle 10 is illustrated in accordance with a first embodiment. As shown in FIG. 2, the vehicle 10 includes an air conditioning system 12 with a controller 14. The controller 14 is configured to operate the air conditioning system in accordance with a conventional cooling operation and upon termination of the cooling operation, the controller is configured to operate the air conditioning system 12 in order to retard (slow down) the release of moisture that can accumulate within portions of the air conditioning system 12, as is explained in greater detail below.

The vehicle 10 includes, among other things, a passenger compartment 16, a windshield 18 and a power source, such as an engine 20 that provides rotary power to the vehicle 10. The engine 20 can be an internal combustion engine, an electric motor or a hybrid power source that includes both an electric motor and an internal combustion engine. However, in the depicted embodiment, the engine 20 is shown in FIG. 2 as an internal combustion engine.

As shown in FIG. 2, the air conditioning system 12 includes a compressor 22, a condenser 24, an expansion device 26, an evaporator 28 and the controller 14. The compressor 22 is preferably powered by the engine 20 in a conventional manner, but can alternatively be powered by an electric motor (not shown) separate from the engine 20. The compressor 22 is fluidly connected to the condenser 24 and the evaporator 28 by refrigerant tubing in a conventional manner. The compressor 22 is configured to compress low pressure refrigerant received from the evaporator 28 and deliver high pressure refrigerant to the condenser 24.

It should be understood from the drawings and description herein that the compressor 22 can be any of a variety of types of compressors. For example, the compressor 22 can include a clutch mechanism (not shown) that is controlled by the controller 14, such that the controller 14 manages operation of the compressor by cycling the clutch between an engaged orientation (compressor on) and a dis-engaged orientation (compressor off). Hence, with this compressor configuration, the controller 14 manages the operation of the compressor 22 by cycling the compressor 22 on and off.

Alternatively, the compressor 22 can include an internal variable output control mechanism connected to the controller 14. In this alternative compressor configuration, the compressor 22 includes a main shaft that continuously rotates during operation of the air conditioning system 12. However, the controller 14 manages operation of the compressor 22 by adjusting the internal variable control mechanism to change, for example, the overall outputted refrigerant pressure exiting the compressor 22. In other words, the compressor 22 in this alternate configuration is operated continuously, and is not cycled completely on or off. Rather, the compressed refrigerant output of the compressor 22 is adjusted. Specifically, the compressor 22 is operated to provide an adjustable compressed refrigerant output, where the output is adjustable between a high pressure output and a lowered pressure output, where the lowered pressure output still provides compressed refrigerant to the evaporator 28, but at reduced levels.

Hence, in the following description of the various embodiments of the moisture releasing operation, when reference is made to cycling the compressor 22 on and off, the inventor can also be referring to cycling the compressor 22 between the high pressure output and the lowered pressure output, as defined in the paragraph above (i.e., the compressor 22 is not required to turn completely off).

The condenser 24 is fluidly coupled to the compressor 22 to receive the high pressure refrigerant from the compressor 22. The condenser 24 includes outer surfaces that are configured to dissipate heat when the compressor 22 is operated to remove heat from the high pressure refrigerant.

The expansion device 26 is operatively installed at any of a variety of locations along the refrigerant line between the condenser 24 and the evaporator 28. The expansion device 26 receives high pressure refrigerant from the condenser 24 and allows the refrigerant to expand such that low pressure refrigerant enters the evaporator 28. The expansion device 26 is a conventional device that can be an electronic valve controlled by the controller 14 or can be an orifice tube that gradually releases refrigerant into the evaporator 28 in a conventional manner.

The evaporator 28 is a heat exchanging device that includes fins with outer surfaces 30 that are configured to absorb heat from air flowing past the outer surfaces 30. The outer surfaces 30 of the evaporator 28 define heat transferring portions of the evaporator 28. Specifically, when the air conditioning system 12 is operating to provide cooling, the evaporator 28 effectively cools air that is delivered to the passenger compartment 16 in a conventional manner. More specifically, the evaporator 28 is fluidly coupled to the condenser 24 via the expansion device 26 to receive the refrigerant from the condenser 24. The evaporator 28 is also fluidly coupled to the compressor 22 thereby supplying the refrigerant to the compressor 22.

The evaporator 28 has an upstream side 32 and a downstream side 34. A blower motor 36 coupled to the controller 14 and/or to a passenger control panel 38 within the passenger compartment 16, pushes or pulls airflow across the outer surfaces 30 from the upstream side 32 to the downstream side 34 in order to draw heat out of the airflow such that cooled air is supplied to the passenger compartment 16 when the air conditioning system 12 is engaged in the cooling operation.

The controller 14 is operatively coupled to the compressor 22 to manage operation of the compressor 22 during the cooling operation such that heat is removed from air flowing across heat transferring portions (the outer surfaces 30) of the evaporator 28. The cooling operation is a conventional operation and therefore, only a brief description of the cooling operation is provided below for the sake of brevity. The controller 14 is further configured to manage operation of the compressor 22 in accordance with the moisture releasing operation in response to termination of the cooling operation. Specifically, the moisture releasing operation includes finite operation of the compressor 22 in order to retard release of moisture from the heat transferring portions or outer surfaces 30 of the evaporator 28, after which the controller 14 ceases operation of the compressor 22, as is described in greater detail below.

The cooling operation can include any of a variety of configurations for operating the compressor 22. For example, in a basic configuration, when an occupant turns on the air conditioning system 12 using the control panel 38, the compressor 22 is operated in response to signals from a conventional refrigerant pressure sensor (not shown) and/or a temperature sensor S located adjacent to the evaporator 28, or downstream from the evaporator 22. Typically the pressure sensor is located on a low pressure side of the air conditioning system 12, for example at or within the evaporator 28, or at a low pressure side of the compressor 22. When the controller 14 detects that the refrigerant pressure at the evaporator 28 is greater than a predetermined level, the compressor 22 is operated to draw refrigerant from the evaporator 28 in order to reduce the refrigerant pressure level at the evaporator 28 or until a desired temperature is achieved at the evaporator 28 and cool the passenger compartment 16. The temperature sensor S is preferably an evaporator temperature sensor positioned to measure a temperature in an area proximate to the evaporator 28 that is indicative of an evaporator temperature of the evaporator 28, or indicative of the temperature of air flowing on the downstream side 34 of the evaporator 28.

Alternatively, more sophisticated systems can be employed to operate the air conditioning system 12, where various additional sensors provide feedback to the controller 14 to maximize efficiency of compressor operation and the cooling operation. Since such methods and configurations for operating the air conditioning are conventional, further description is omitted for the sake of brevity.

As mentioned above, the controller 14 is also configured to operate the air conditioning system 12 in accordance with the moisture releasing operation. More specifically, when an occupant turns off the air conditioning system 12 via the control panel 38, thus terminating the cooling operation of the air conditioning system 12, the controller 14 operates the air conditioning system 12 in accordance with the moisture releasing operation.

When the controller 14 operates the air conditioning system 12 in accordance with the cooling operation, if there is moisture in the air being cooled, that moisture has a tendency to condense on the outer surfaces 30 of the evaporator 28. The condensed moisture may form droplets that fall from the evaporator 28 and drain out of the vehicle 10 via a drain (not shown). However, at least some of the condensed moisture typically remains on the outer surfaces 30 of the evaporator 28 and/or on surfaces of an evaporator housing (not shown).

When the cooling operation of the air conditioning system 12 is terminated (e.g., manually shut off by an occupant), the evaporator 28 typically warms from a cooled state, thus making it possible for the condensed moisture to evaporate and reenter the passenger compartment 16. Since the cooled air is relatively dry as a result of the cooling operation, the condensed moisture rapidly evaporates. This rapid evaporation of the condensed moisture can cause any of a variety of undesirable circumstances. For example, rapid release of moisture into the passenger compartment 16 can cause the glass surfaces that surround the passenger compartment 16 to fog due to the moisture condensing on interior glass surfaces within the passenger compartment 16. Further, the rapid release of moisture can have an undesirable aroma and can create an uncomfortably humid environment within the passenger compartment 16. The moisture releasing operation retards or slows down the release of the condensed moisture in order to avoid these undesirable circumstances.

Figure 6:
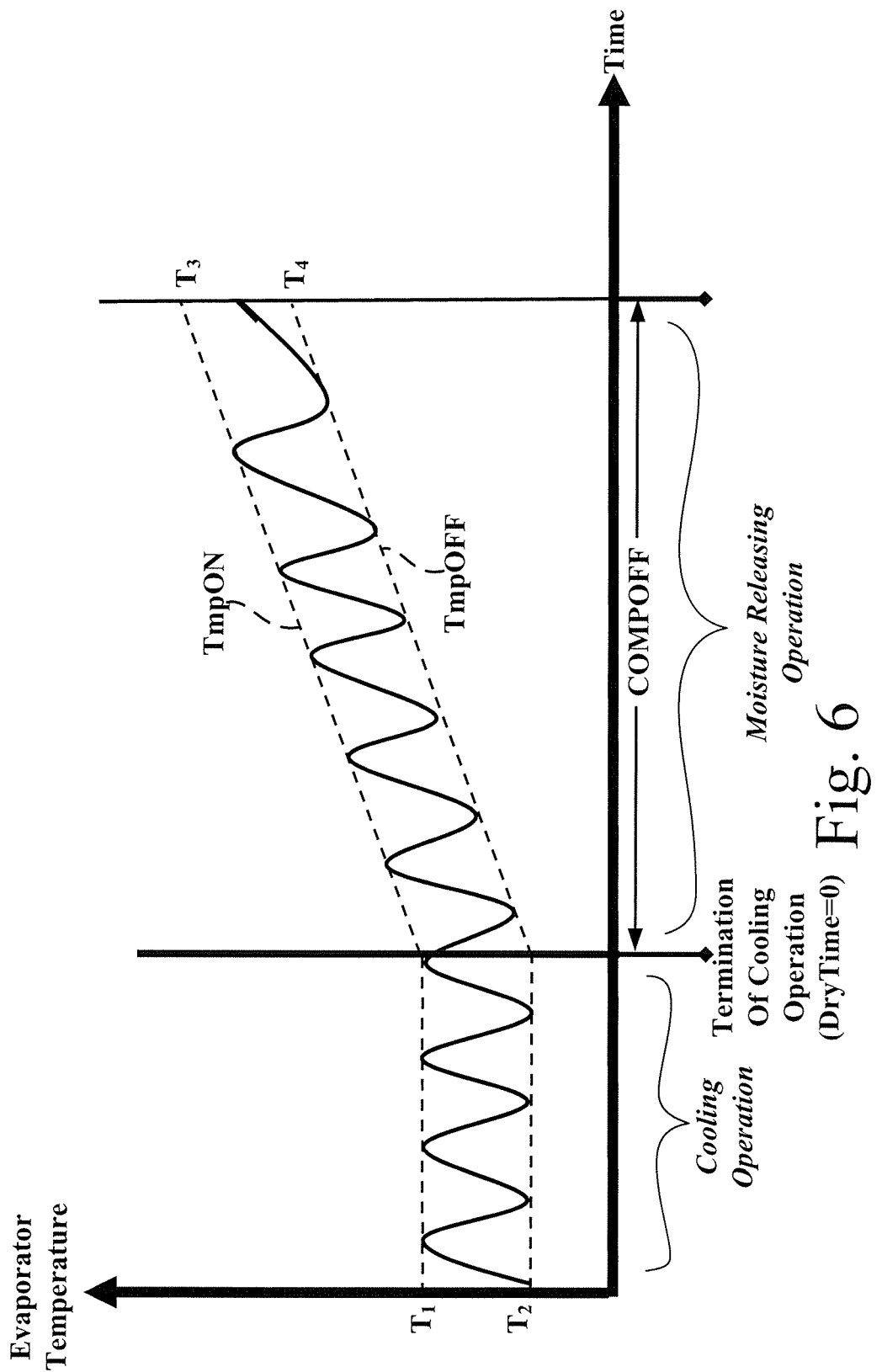
FIG. 6 is an exemplary graph depicting the evaporator temperature within the air conditioning system as a function of time during the moisture releasing operation in accordance with the first embodiment.
Figure 8:
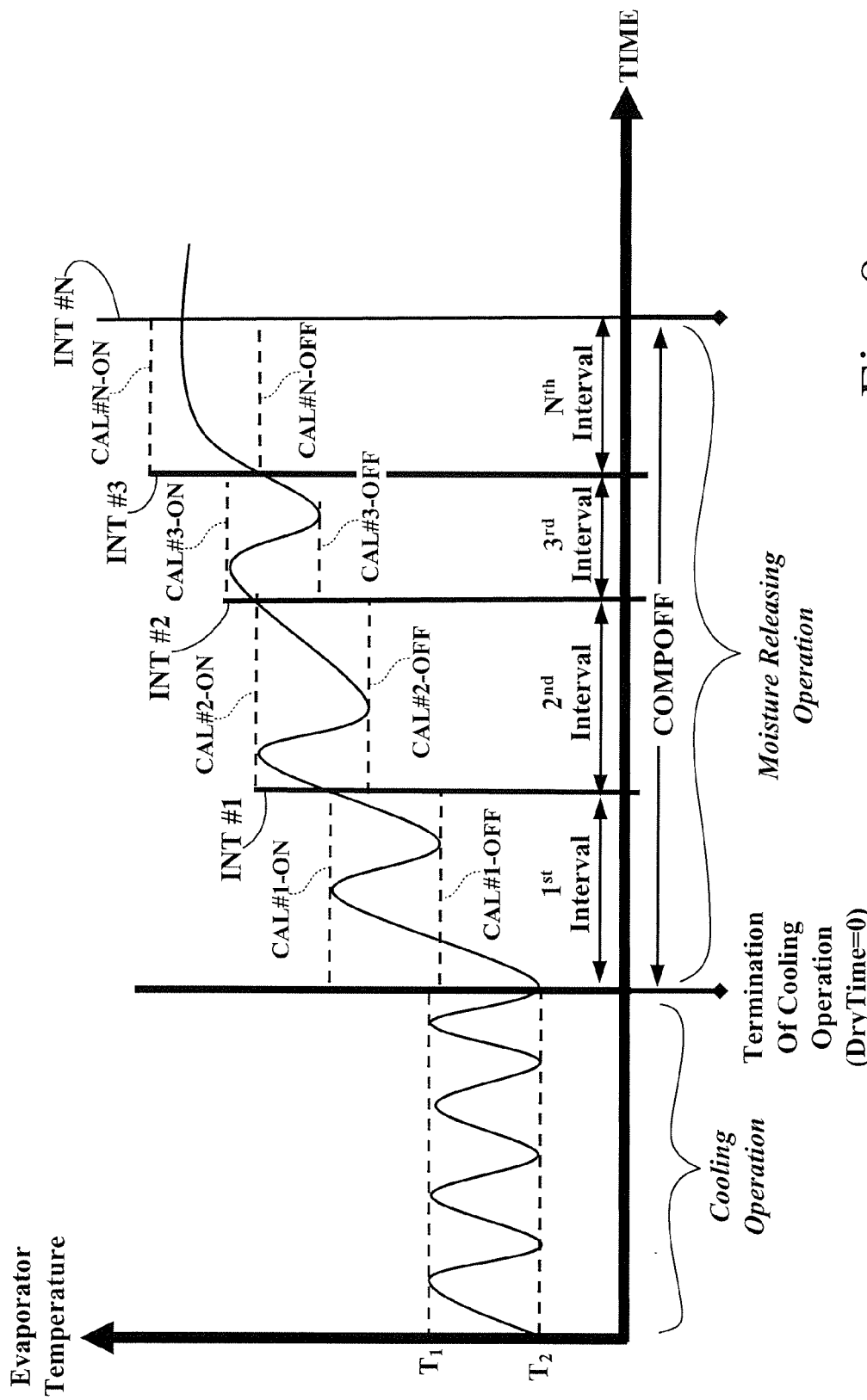
FIG. 8 is an exemplary graph depicting the evaporator temperature within the air conditioning system as a function of time during the moisture releasing operation in accordance with the second embodiment.
Figure 10:
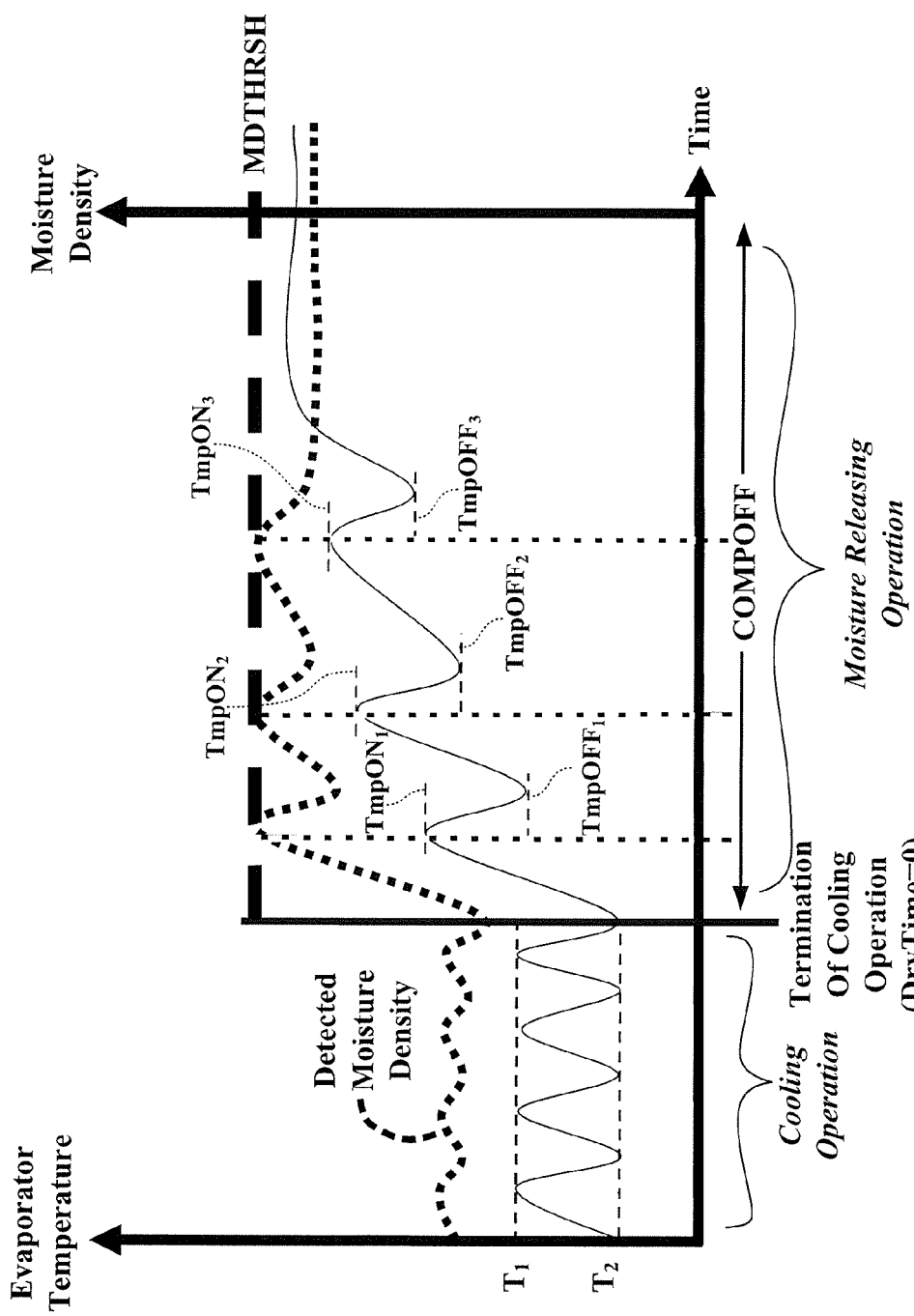
FIG. 10 is an exemplary graph depicting the evaporator temperature within the air conditioning system as a function of time during the moisture releasing operation in accordance with the third embodiment.

Preferably, the air conditioning system 12 is controlled in accordance with the moisture releasing operation by the controller 14 only when the vehicle 10 continues to be operated and/or driven after termination of the cooling operation. For example, when the vehicle 10 is being operated (driven) and the air conditioning system 12 is suddenly shut off by an occupant, the controller 14 operates the compressor 22 in accordance with the moisture releasing operation to prevent moisture from evaporating too quickly from the outer surfaces 30 (the cooling surfaces) of the evaporator 28. During the moisture releasing operation, the controller 14 continues to operate the compressor 22 for a predetermined interval of time after termination of the cooling operation, or for a predetermined number of on and off cycles after termination of the cooling operation, after which, the controller 14 ceases operation of the compressor 22, as shown in FIGS. 6, 8 and 10.

Various embodiments of the moisture releasing operation are described below with reference to the flowcharts in FIGS. 3 thru 11. In the embodiments described below, the moisture releasing operation is only engaged after the air conditioning system 12 has been running in accordance with the cooling operation, with the compressor 22 cycling on and off (or between the high pressure output and the lowered pressure output) and possibly condensing moisture. More specifically, the moisture releasing operation is only enabled after the cooling operation has been terminated, since there is a potential for accumulation of condensed moisture on and around the evaporator 28.

It should be understood from the description herein, that the cooling operation can further include the air conditioning system 12 being engaged in a defrosting or defogging operation where moisture is removed from glass surfaces within the passenger compartment 16, such that moisture condenses on the outer surfaces 30 of the evaporator 28 during the defrosting operation.

Figure 3:
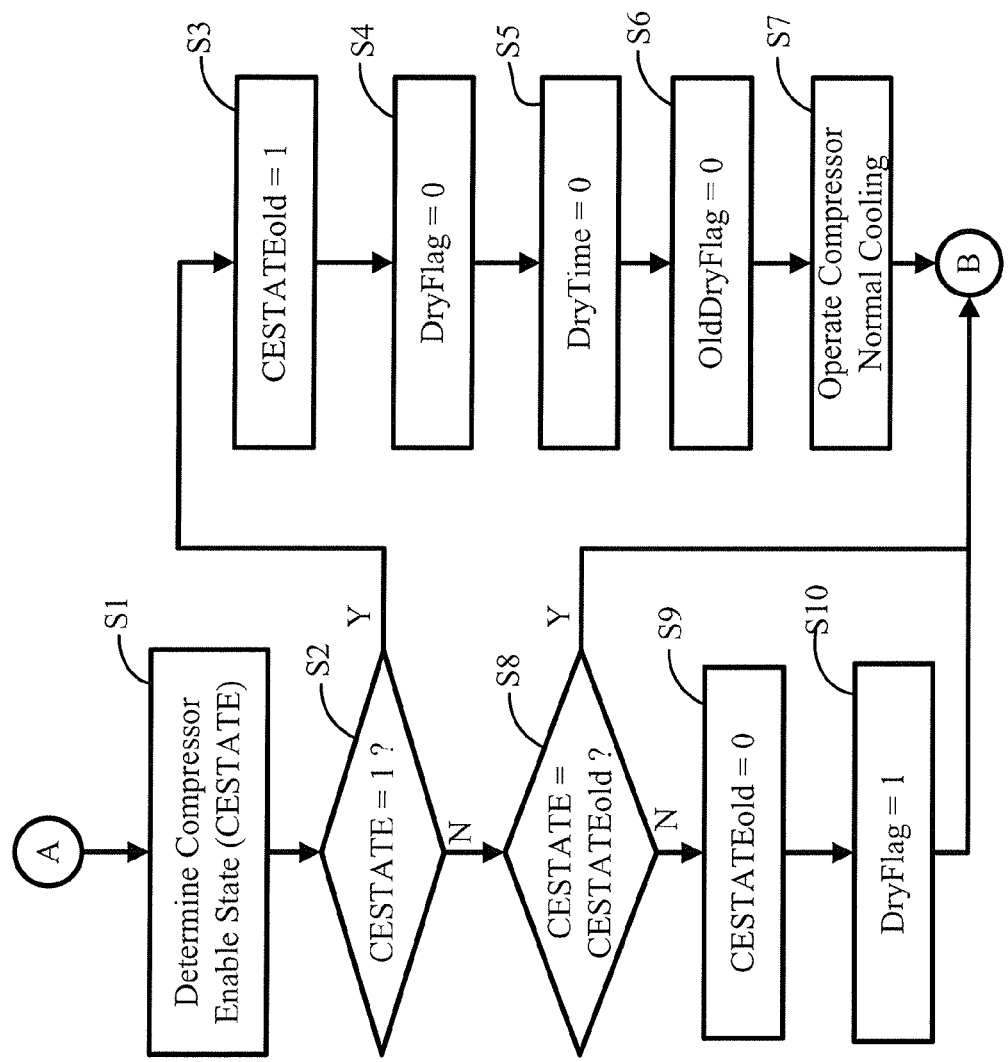
FIG. 3 is a flowchart outlining basic operational steps of a moisture releasing operation of the air conditioning system in accordance with the first embodiment.

FIG. 3 shows a basic operation of the air conditioning system 12 where the air conditioning system 12 is engaged in the cooling operation or where the cooling operation has just been terminated by, for example, the passenger changing the settings of the air conditioning system 12 at the control panel 38. Specifically, at step S1, the controller 14 checks the operation of the compressor 22, and the settings at the control panel 38.

At step S1, the controller 14 determines the value of a variable CESTATE. The variable CDSTATE represents the operational state of the compressor 22, where one (1) represents standard or normal operating states and where zero (0) represents a non-operational state. The standard or normal operating states include, for example, defrosting operation and/or cooling operation. With every iteration of the steps in the flowcharts depicted in FIG. 3, the controller 14 checks the value of the variable CESTATE. Specifically, at step S2 in FIG. 3, the controller 14 checks to see whether or not CESTATE is equal to one (1). If CESTATE is equal to one (1), then operation moves to step S3. If CESTATE is not equal to one (1), then operation moves to step S8.

At step S3, a variable CESTATEold is made equal to one (1). Next, at step S4, a variable DryFlag is made equal to zero (0). When the variable DryFlag is made equal to zero, it provides an indication in subsequent steps that the air conditioning system 12 is currently being used to provide cooling. Next, at step S5, a variable DryTime is also made equal to zero. At step S6, a variable OldDryFlag is made equal to zero (0). The variable OldDryFlag is an optional variable that is employed in the third embodiment shown in FIGS. 9 and 10. In other embodiments, it can be omitted. Next, at step S7, standard or normal operation of the compressor 22 continues or can be implemented if cooling or defogging has been requested.

At step S8, the controller 14 determines whether or not the variable CESTATE is equal to CESTATEold. The value of the variable CESTATEold provides an indication of whether or not the compressor 22 is already engaged in the moisture releasing operation. In step S8, if CESTATE is equal to CESTATEold, then operation moves to circle B and the steps depicted in FIG. 4. If CESTATE is not equal to CESTATEold, then operation moves to step S9. If CESTATE is equal to CESTATEold, it means that the moisture releasing operation is already in progress and can continue. If CESTATE is not equal to CESTATEold in step S8, it means that the moisture releasing operation has just been engaged.

At step S9, the variable CESTATEold is made equal to zero (0). At step S10, the variable DryFlag is made equal to one (1), and operation moves to the circle B, which links to the flowchart of FIG. 4. The variable DryTime is used later in the logic depicted in FIG. 4 as an indication of the length of time for which the moisture releasing operation has been engaged. Hence, when the cooling operation is terminated, the variable DryTime has been set to zero (step S5) for the start of the moisture releasing operation. When the DryFlag variable is equal to one (1) in step S10, the moisture releasing operation is engaged.

Figure 4:
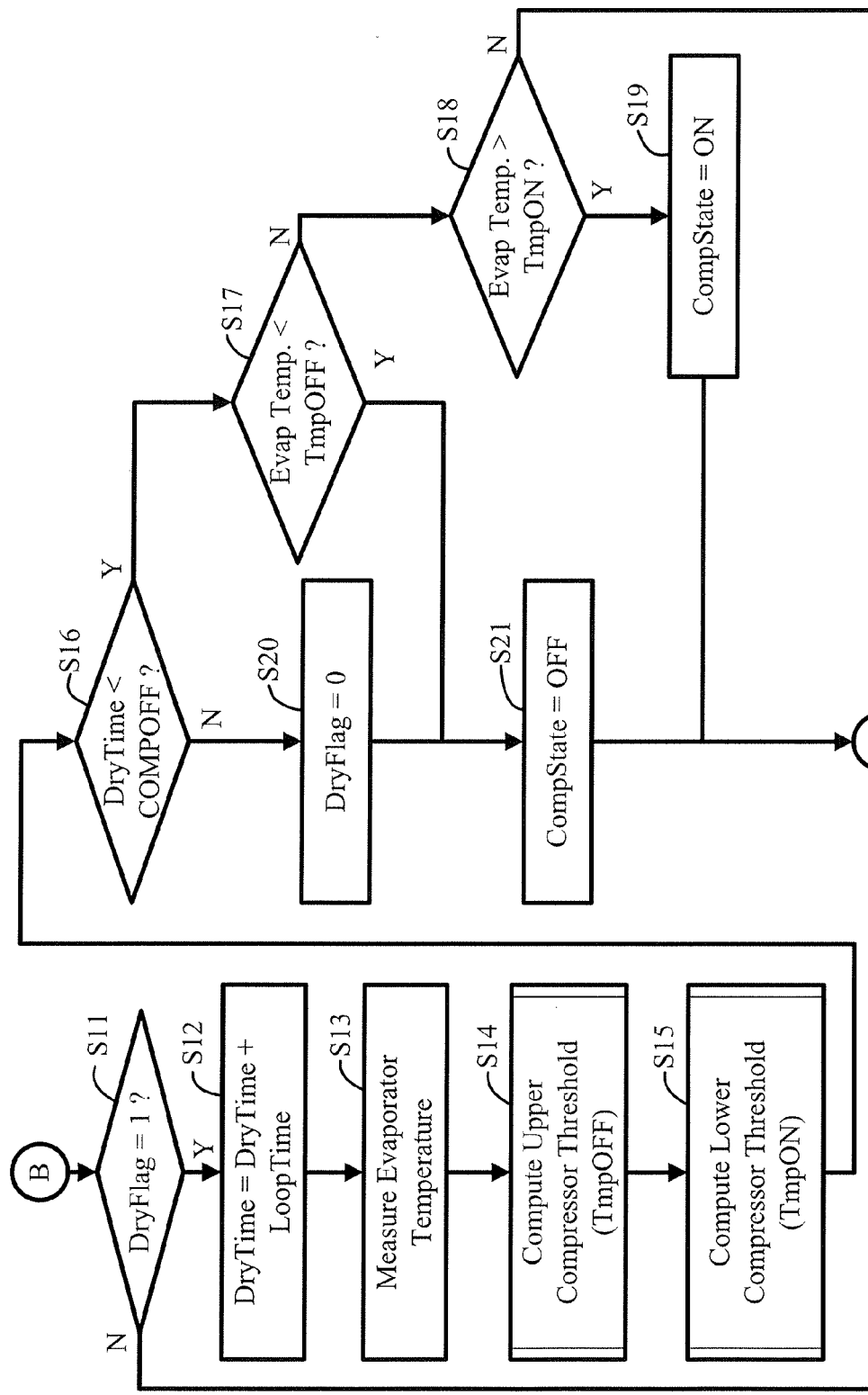
FIG. 4 is another flowchart showing further operational steps of the moisture releasing operation of the air conditioning system in accordance with the first embodiment.

In FIG. 4, at step S11, the controller 14 determines whether or not the variable DryFlag is equal to 1. If the variable DryFlag is equal to 1, then the cooling operation has been terminated and the moisture releasing operation is enabled and operation subsequently moves to step S12. If the controller 14 determines that the variable DryFlag is not equal to 1, then operation moves to the circle A and returns to the steps in the flowchart depicted in FIG. 3.

At step S12 the variable DryTime is made equal to the previous value of DryTime plus a time related variable LoopTime. LoopTime is an interval of time corresponding to the time elapsed since the last iteration of the steps depicted in the flowcharts in FIGS. 3 and 4. For example, the cycling time of the controller 14 through the flowchart can be approximately 100 ms (milli-seconds). Therefore the variable LoopTime can be set equal to 100 ms. However, the variable LoopTime can be set to a any predetermined value based upon predicted operation of the air conditioning system 12 and predicted operation of the vehicle 10. Alternatively, a timer can be used to monitor the passage of time between flowchart interations.

Operation then moves to step S13 where the evaporator temperature is measured via the sensor S. Operation then moves to a subroutine S14, where a variable TmpOFF is calculated or otherwise determined or defined. For example, the variable TmpOFF can be a computed temperature threshold that corresponds to an evaporator temperature at which the compressor is to be turned off (or controlled to produce the lowered pressure output) during the moisture releasing operation. Therefore, the variable TmpOFF can be re-calculated or redefined with each iteration of the steps depicted in the flowcharts of FIGS. 3 and 4, as is described in greater detail below. Alternatively, the variable TmpOFF can be re-defined in accordance with predetermined step-wise temperature increases. In other words, TmpOFF can be a calculated, determined or pre-defined set of numbers corresponding to a compressor OFF threshold used in the logic depicted in FIG. 4.

Operation then moves to a subroutine S15, where a variable TmpON is calculated or otherwise determined or defined. For example, the variable TmpON can be a computed threshold that corresponds to an evaporator temperature at which the compressor is to be turned on during the moisture releasing operation. Therefore, the variable TmpON can be re-calculated or redefined with each iteration of the steps depicted in the flowcharts of FIGS. 3 and 4, as is described in greater detail below. Alternatively, the variable TmpON can be re-defined in accordance with predetermined step-wise temperature increases. In other words, TmpON can be a calculated, determined or pre-defined set of numbers corresponding to a compressor ON threshold used in the logic depicted in FIG. 4.

Figure 5:
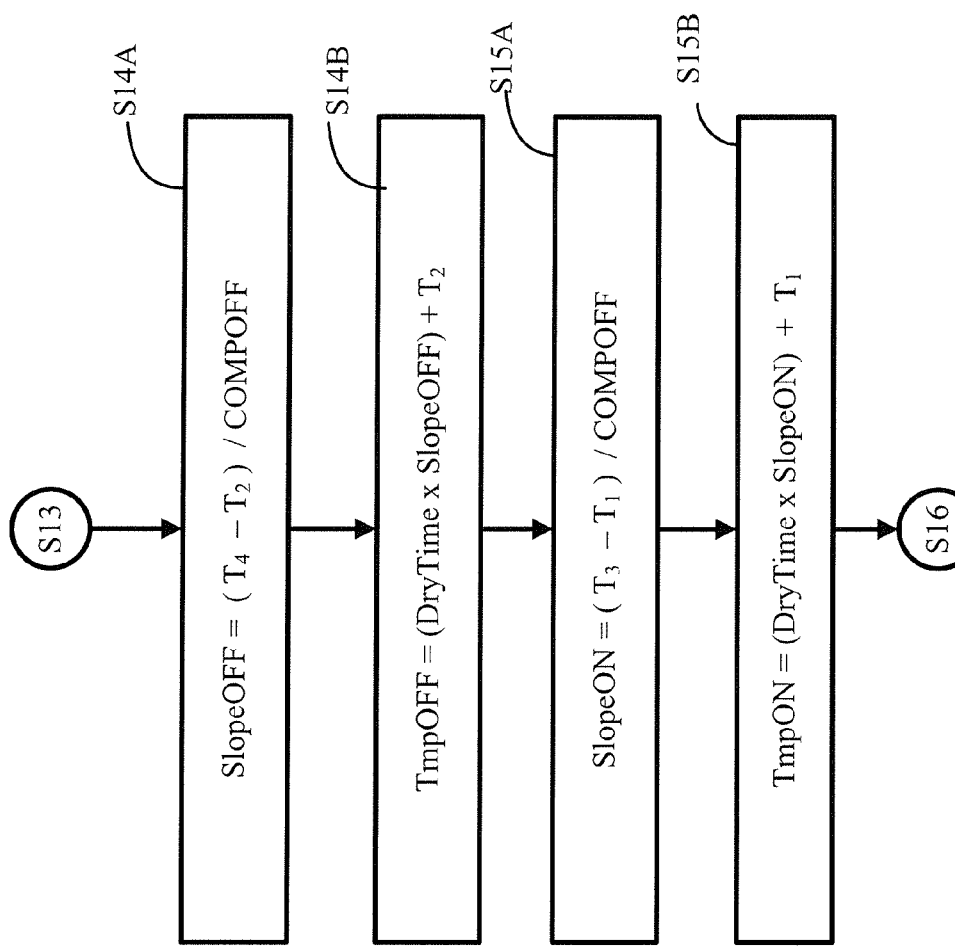
FIG. 5 is a flowchart outlining detailed operational steps of the moisture releasing operation of the air conditioning system in accordance with the first embodiment.
Figure 7:
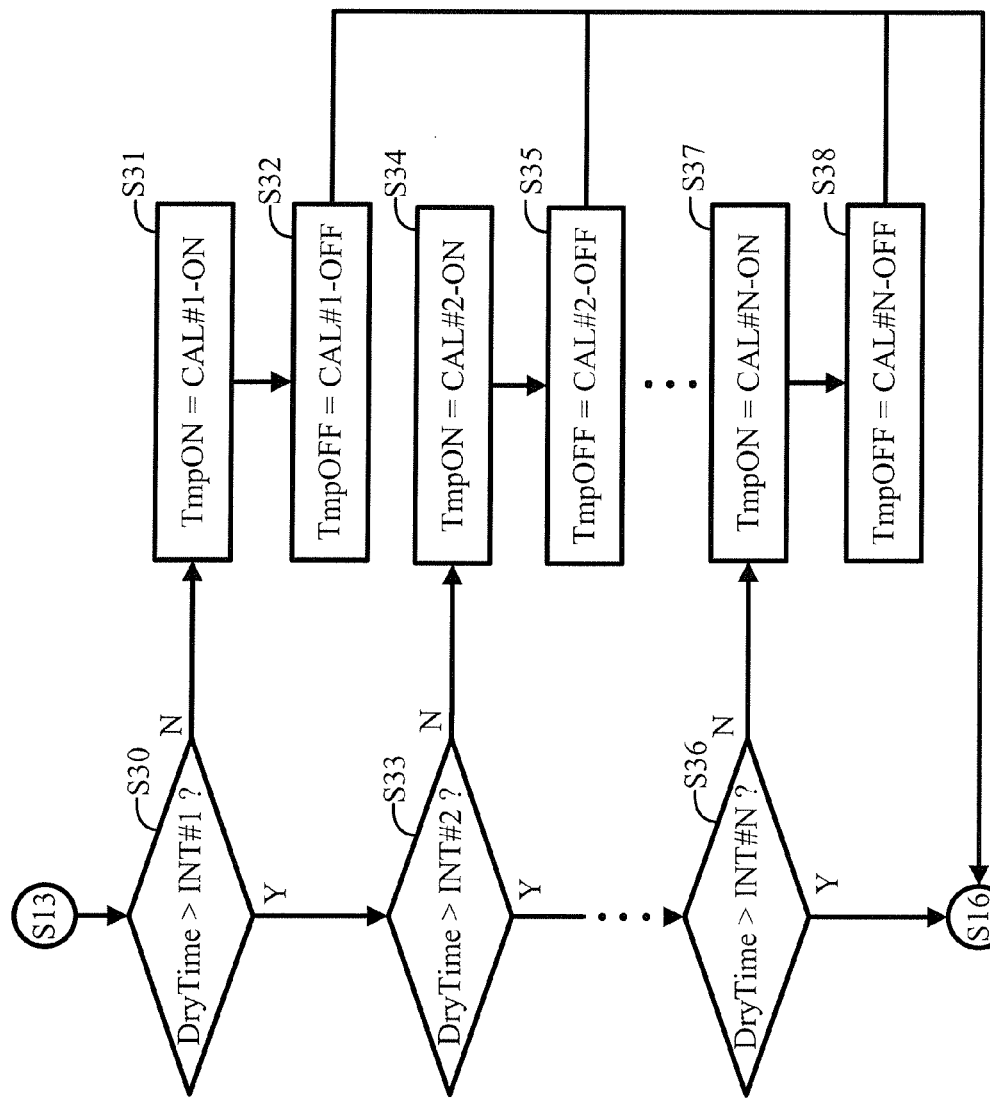
FIG. 7 is a flowchart outlining detailed operational steps of a moisture releasing operation of the air conditioning system in accordance with a second embodiment.
Figure 9:
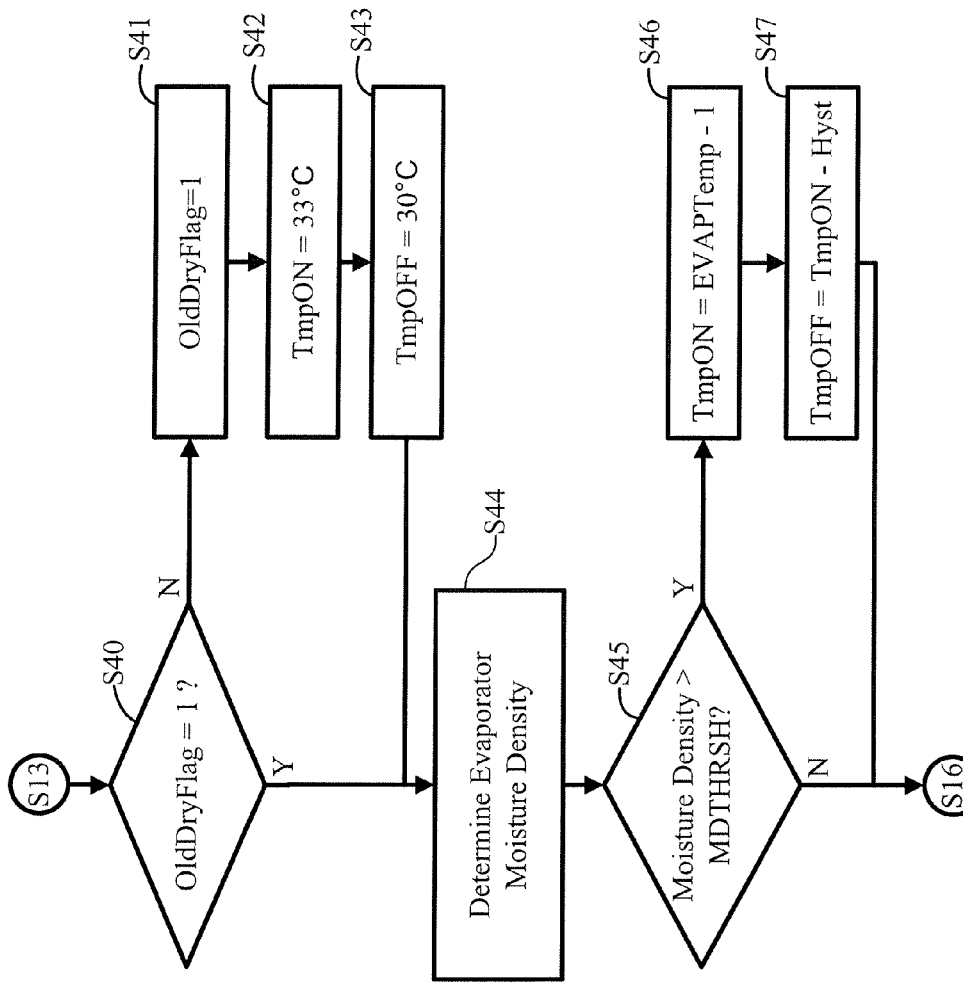
FIG. 9 is a flowchart outlining detailed operational steps of a moisture releasing operation of the air conditioning system in accordance with a third embodiment.

The variables TmpOFF and TmpON can be computed, calculated or defined in a variety of manners. A first embodiment depicted in FIGS. 5 and 6, shows a first method for determining variables TmpOFF and TmpON. A second embodiment depicted in FIGS. 7 and 8, shows a second method for determining the variables TmpOFF and TmpON. A third embodiment depicted in FIGS. 9 and 10, shows a third method for determining the variables TmpOFF and TmpON. These three different embodiments are described one by one below, after completion of the description of the logic depicted in FIG. 4.

At step S16, the controller 14 determines whether or not the variable DryTime is less than a variable COMPOFF. The variable COMPOFF is a predetermined fixed value based upon consideration of the design of the vehicle 10, the cooling capacity of the air conditioning system 12 and the design of passenger compartment 16. The variable COMPOFF represents the maximum period of time that the moisture releasing operation is engaged following termination of the cooling operation. For example, for a large vehicle, such as a van or SUV where the air conditioning system 12 potentially has a large cooling capacity, and thus a tendency to condense a large quantity of moisture on the outer surfaces 30 of the evaporator 28, the variable COMPOFF can be within a range of 1 minute to 5 minutes. However, in a relatively small vehicle, such as a sports car or coupe, where the air conditioning system 12 typically has a small cooling capacity (compared to an SUV or van), and a tendency to condense a corresponding small quantity of moisture on the outer surfaces 30 of the evaporator 28, the variable COMPOFF can be within a range of 30 seconds to 2 minutes.

At step S16, if the controller 14 determines that the variable DryTime is less than COMPOFF, then operation moves to step S17. At step S16, if the controller 14 determines that the variable DryTime is not less than COMPOFF, then operation moves to step S20.

At step S17, the controller 14 determines whether or not the evaporator temperature Evap Temp, measured by the temperature sensor S, is less than the previously calculated variable TmpOFF. If Evap Temp is not less than the variable TmpOFF, then operation moves to step S18. If Evap Temp is less than the variable TmpOFF, then operation moves to step S21.

At step S18, the controller 14 determines whether or not the evaporator temperature Evap Temp, measured by the temperature sensor S, is greater than the previously calculated variable TmpON. If Evap Temp is greater than the variable TmpON, then operation moves to step S19. If Evap Temp is not greater than the variable TmpON, then operation moves to the circle A and back to the steps depicted in the flowchart in FIG. 3.

At step S19, the variable CompState is made equal to ON. The variable CompState is a control variable that the controller 14 uses in the control of the compressor 22. Specifically, when the variable CompState is equal to ON, the compressor 22 is cycled on by the controller 22. When the variable CompState is equal to OFF, the compressor 22 is cycled off by the controller 22. The value of CompState is generally only relevant during the moisture releasing operation and not used during the cooling operation.

At step S20, the variable DryFlag is made equal to zero and operation moves to step S21. At step S21, the variable CompState is made equal to OFF. From step S21, operation moves to the circle A and back to the steps depicted in the flowchart in FIG. 3.

A description is now provided for the calculations of the variables TmpOFF and TmpON represented by the subroutines S14 and S15 of the flowchart in FIG. 4 in accordance with the first embodiment.

In FIG. 5, the subroutine S14 includes steps S14A and S14B, described below. Similarly, in FIG. 5, the subroutine S15 includes steps S15A and S15B, described below. The steps 14A, 14B, 15A and 15B include the following variables, SlopeOFF, SlopeON, $T_1$, $T_2$, $T_3$ and $T_4$. The variables $T_1$, $T_2$, $T_3$ and $T_4$ are represented in the graph shown in FIG. 6. To better understand the steps depicted in FIG. 5, a brief description of FIG. 6 is beneficial.

FIG. 6 is a chart that shows a representation of the cycling of the compressor 22 on and off by the controller 14, first in accordance with the cooling operation (left side of chart) and then in accordance with the moisture releasing operation (right side of chart). In accordance with the cooling operation, the controller 14 cycles the compressor 22 on and off based upon measurements by the evaporator sensor S of the temperature on the downstream side 34 of the evaporator 28. Specifically, in accordance with the cooling operation, the compressor 22 is turned on whenever the temperature rises to the compressor threshold temperature $T_1$. Further, the compressor 22 is turned off whenever the temperature falls to the compressor threshold temperature $T_2$.

When the cooling operation is terminated, the controller 14 operates the compressor 22 in accordance with the moisture releasing operation, such that the compressor 22 is turned on whenever the measured evaporator temperature rises to TmpON. Further, the compressor 22 is turned off whenever the measured evaporator temperature falls to TmpOFF. Since the variables TmpON and TmpOFF are repeatedly re-calculated to gradually increment upward, the evaporator 28 is prevented from releasing held moisture too rapidly. Instead, the moisture is released gradually. The moisture releasing operation terminates when DryTime becomes equal to or greater than the variable COMPOFF, as indicated in FIG. 6.

The temperature $T_1$ is the final temperature at which the controller 14 cycles the compressor 22 on during the cooling operation. The temperature $T_1$ can change during the course of operation of the compressor 22 in accordance with the cooling operation, for example, due to changes in the air conditioning needs of an occupant. However, for the purposes of the subroutines S14 and S15, the temperature $T_1$ is the final temperature used by the controller 14 to cycle the compressor 22 on prior to termination of the cooling operation.

The temperature $T_2$ is the final temperature at which the controller 14 cycles the compressor 22 off during of the cooling operation. The temperature $T_2$ can change during the course of operation of the compressor 22 in accordance with the cooling operation, for example, due to changes in the air conditioning needs of an occupant. However, for the purposes of the subroutines S14 and S15, the temperature $T_2$ is the final temperature used by the controller 14 to cycle the compressor 22 off prior to termination of the cooling operation. As shown in FIG. 6, the time interval COMPOFF begins at the termination of the cooling operation (where DryTime is equal to zero (0)) and ends in conjunction with termination of the moisture releasing operation.

The temperature $T_3$ is the final temperature at which the controller 14 potentially cycles the compressor 22 on during the moisture releasing operation. The temperature $T_3$ is a pre-defined value that is determined in a manner similar to the determination of the time interval COMPOFF. However, the temperature $T_3$ is preferably between 16 and 21 degrees Celsius (approximately 60 and 70 degrees Fahrenheit).

The temperature $T_4$ is the final temperature at which the controller 14 potentially cycles the compressor 22 off during the moisture releasing operation. The temperature $T_4$ is a pre-defined value that is determined in a manner similar to the determination of the time interval COMPOFF. However, the temperature $T_4$ is preferably between 12 and 18 degrees Celsius (approximately 53 and 64 degrees Fahrenheit).

Referring again to FIG. 5, in step S14A, the variable SlopeOFF is calculated according to the following equation:

$$\text{SlopeOFF}=[(T_4)-(T_2)]\div\text{COMPOFF}$$

Specifically, SlopeOFF is equal to the difference between the temperatures $T_4$ and $T_2$ divided by the time interval COMPOFF. The variable SlopeOFF therefore has the units degrees per unit of time and is subsequently used in Step S14B. The variable SlopeOFF basically represents the slope of the line marked TmpOFF in FIG. 6.

In FIG. 5, operation moves to step S14B next. At step S14B, the variable TmpOFF is calculated by the controller 14 using the following equation:

$$\text{TmpOFF}=(\text{DryTime}\times\text{SlopeOFF})+T_2$$

Specifically, the variable TmpOFF is equal to the product of the variable DryTime and SlopeOFF plus the temperature $T_2$. In the above equation, the variable DryTime is defined in step S12. The variable SlopeOFF is determined in step S14A. Thus, over time during the moisture releasing operation, the variable TmpOFF (shown as a line in FIG. 6) gradually increases. In other words, the variable TmpOFF is gradually incremented upward during the moisture releasing operation.

Operation then moves to step S15A in FIG. 5. At step S15A, the variable SlopeON is calculated according to the following equation:

$$\text{SlopeON}=[(T_3)-(T_1)]\div\text{COMPOFF}$$

Specifically, SlopeON is equal to the difference between the temperatures $T_3$ and $T_1$ divided by the time interval COMPOFF. The variable SlopeON therefore has the units degrees per unit of time and is subsequently used in Step S15B. The variable SlopeON basically represents the slope of the line marked TmpON in FIG. 6.

In FIG. 5, operation moves to step S15B next. At step S15B, the variable TmpON is calculated by the controller 14 using the following equation:

$$\text{TmpON}=(\text{DryTime}\times\text{SlopeON})+T_1$$

Specifically, the variable TmpON is equal to the product of the variable DryTime and SlopeON plus the temperature $T_1$. In the above equation, the variable DryTime is defined in step S12. The variable SlopeON is determined in step S15A. Thus, over time during the moisture releasing operation, the variable TmpON (shown as a line in FIG. 6) gradually increases. In other words, the variable TmpON is gradually incremented upward during the moisture releasing operation.

As shown in FIG. 6, in the first embodiment, the calculations made in accordance with the steps depicted in FIG. 5, result in approximately linear changes in the values of the variables TmpOFF and TmpON. The approximately linear changes in the values of the variables TmpOFF and TmpON make it possible to gradually release moisture from the evaporator 28 during the moisture releasing operation, as compared to the conventional termination of all compressor cycling, where the moisture is rapidly released.

As a result, the possibility of released moisture condensing on interior glass surfaces of the passenger compartment 16 of the vehicle 10 is reduced or eliminated. Further, unpleasant aromas and/or excessive concentrations of moisture passing through the passenger compartment 16 are also reduced or eliminated as a result of operating the air conditioning system 12 in accordance with the moisture releasing operation. In the first embodiment, the controller 14 sets the compressor ON temperature (TmpON) and the compressor OFF temperature (TmpOFF) such that each successive value of the compressor ON temperature and the compressor OFF temperature is increased linearly. However, alternative methods for determining and/or calculating the variables TmpOFF and TmpOn are presented in the following alternative embodiments.

Second Embodiment

Referring now to FIGS. 7 and 8, operation of the controller 14 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The operations depicted in FIGS. 3 and 4 are included in the second embodiment except that subroutines S14 and S15 of FIG. 4 are replaced with the steps S30 thru S37, as depicted in FIG. 7. Otherwise, the operations in FIGS. 3 and 4 are identical between the first and second embodiments. Further, the variable COMPOFF, as described above, is also used in the second embodiment.

In the second embodiment, several variables are defined when the air conditioning system 12 starts up and are used each time the controller 14 operates the air conditioning system 12 in accordance with the moisture releasing operation. Specifically, variables INT#1 thru INT#N are defined in order to set time intervals, such as a first interval, a second interval and so on to an Nth or final interval N, as shown in FIG. 8.

As indicated in FIG. 8, at some point in time, the cooling operation is terminated (Termination of Cooling Operation). The period of time between the termination of the cooling operation and the time interval COMPOFF, is divided into the time intervals according to the variables INT#1, INT#2 ... thru INT#N. The variable N used to set the number of these time intervals is dependent upon the design of the vehicle 10, the size of the passenger compartment 16 and the capacity of the air conditioning system 12. In larger vehicles, there may be between ten and fifty time intervals and a corresponding number of variables INT#1, INT#2 ... thru INT#N. In a smaller vehicle, there may be between five and thirty time intervals and corresponding variables INT#1, INT#2 ... thru INT#N. In other words, the number of time intervals and number of variables INT#1, INT#2 ... thru INT#N varies from vehicle to vehicle and depends upon how long of a time interval COMPOFF is necessary to gradually release moisture from the evaporator 28.

Further, the variables CAL#1-ON, CAL#2-ON ... CAL#N-ON and CAL#1-OFF, CAL#2-OFF ... CAL#N-OFF are also defined by the controller 14 at startup of the air conditioning system 12. The variables CAL#1-ON and CAL#1-OFF are used for the time interval INT#1; the variables CAL#2-ON and CAL#2-OFF are used for the time interval INT#2; ... and the variables CAL#N-ON and CAL#N-OFF are used for the time interval INT#N.

In the second embodiment, after step S13 in FIG. 4, controller 14 moves to step S30 shown in FIG. 7. At step S30, the controller 14 determines whether or not the variable DryTime is greater than the pre-defined variable INT#1. At step S30, if the variable DryTime is not greater than the pre-defined variable INT#1, then control moves to step S31. At step S30, if the variable DryTime is greater than the pre-defined variable INT#1, then control moves to step S33.

At step S31, the variable TmpON is made equal to the pre-defined variable CAL#1-ON. Control then moves to step S32 where the variable TmpOFF is made equal to the pre-defined variable CAL#1-OFF. Subsequently, control moves to step S16 in FIG. 4.

At step S33, the controller 14 determines whether or not the variable DryTime is greater than the pre-defined variable INT#2. At step S33, if the variable DryTime is not greater than the pre-defined variable INT#2, then control moves to step S34. At step S33, if the variable DryTime is greater than the pre-defined variable INT#2, then control moves to step S36 (or to intermediate steps, depending upon how many intervals INT#1 thru INT#N are defined for the air conditioning system 12).

At step S34, the variable TmpON is made equal to the pre-defined variable CAL#2-ON. Control then moves to step S35 where the variable TmpOFF is made equal to the pre-defined variable CAL#2-OFF. Subsequently, control moves to step S16 in FIG. 4.

When the variable DryTime is greater than the predefined variable INT#2 and after all intermediate steps (based upon how many time intervals INT#1 thru INT#N are defined for the air conditioning system 12) control finally moves to step S36. At step S36, the controller 14 determines whether or not the variable DryTime is greater than the pre-defined variable INT#N. At step S36, if the variable DryTime is not greater than the pre-defined variable INT#N, then control moves to step S37. At step S36, if the variable DryTime is greater than the pre-defined variable INT#N, then control moves to step S16 in FIG. 4.

At step 37, the variable TmpON is made equal to the pre-defined variable CAL#N-ON. Control then moves to step S38, where the variable TmpOFF is made equal to the pre-defined variable CAL#N-OFF. Control then moves to back to step S16 in FIG. 4.

FIG. 8 is a chart depicting an example of the time intervals INT#1 thru INT#N, shown with the measured evaporator temperatures, with the compressor cycling on and off in accordance with the moisture releasing operation. Using these operational steps, the controller 14 sets the compressor ON temperature (TmpON) and the compressor OFF temperature (TmpOFF) such that each successive value of the compressor ON temperature and the compressor OFF temperature is progressively increased. As is shown in FIG. 8, the moisture at the evaporator 28 can be gradually dissipated due to the gradual increase in overall temperature of the air flow downstream from the evaporator 28.

Third Embodiment

Referring now to FIGS. 9 and 10, operation of the controller 14 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The operations depicted in FIGS. 3 and 4 are included in the third embodiment except that the subroutines S14 and S15 of FIG. 4 are replaced with the steps depicted in FIG. 9. Otherwise, the operations in FIGS. 3 and 4 are identical between the first and third embodiments.

In the third embodiment, the air conditioning system 12 includes a moisture sensor MS depicted in FIG. 2. The moisture sensor MS can be located on the outer surface 30 of the evaporator 28 or somewhere on the downstream side 34 proximate the evaporator 28. The moisture sensor MS is connected to the controller 14 and provides the controller with moisture measurements. The controller 14 uses the evaporator temperature measured by the sensor S and the moisture content measured by the sensor MS to determine the relative humidity of the air downstream from the evaporator 28.

In other words, in the third embodiment, the moisture sensor MS is configured and arranged to measure moisture in airflow downstream from the evaporator. During the moisture releasing operation, the controller 14 adjusts the compressor ON temperature (TmpON) and the compressor OFF temperature (TmpOFF) based on measurements from the moisture sensor.

TABLE 1

| Meas. Temp. | Measured Relative Humidity (RH) | | | | | | | | | | |
|---|---|---|---|---|---|---|---|---|---|---|---|
| | 0% RH | 10 | 20 | 30 | 40 | 50 | 60 | 70 | 80 | 90 | 100% RH |
| −10° C. | 0.0 | 0.2 | 0.4 | 0.6 | 0.9 | 1.1 | 1.3 | 1.5 | 1.7 | 1.9 | 2.1 |
| −5 | 0.0 | 0.3 | 0.7 | 1.0 | 1.3 | 1.6 | 2.0 | 2.3 | 2.6 | 3.0 | 3.3 |
| 0 | 0.0 | 0.5 | 1.0 | 1.4 | 1.9 | 2.4 | 2.9 | 3.3 | 3.8 | 4.3 | 4.8 |
| 5 | 0.0 | 0.7 | 1.4 | 2.1 | 2.7 | 3.4 | 4.1 | 4.8 | 5.4 | 6.1 | 6.8 |
| 10 | 0.0 | 1.0 | 1.9 | 2.9 | 3.8 | 4.8 | 5.7 | 6.7 | 7.6 | 8.5 | 9.5 |
| 15 | 0.0 | 1.3 | 2.6 | 3.9 | 5.2 | 6.5 | 7.7 | 9.0 | 10.3 | 11.6 | 12.8 |
| 20 | 0.0 | 1.8 | 3.5 | 5.3 | 7.0 | 8.8 | 10.5 | 12.2 | 13.9 | 15.6 | 17.3 |
| 25 | 0.0 | 2.5 | 5.0 | 7.4 | 9.9 | 12.3 | 14.7 | 17.1 | 19.5 | 21.8 | 24.2 |
| 30 | 0.0 | 3.2 | 6.3 | 9.0 | 12.2 | 15.0 | 18.2 | 21.1 | 24.2 | 27.4 | 30.5 |
| 35° C. | 0.0 | 4.0 | 7.9 | 11.8 | 15.7 | 19.7 | 23.7 | 27.5 | 31.8 | 36.0 | 39.0 |

More specifically, the controller 14 processes the measured temperature value and measured moisture content value and compares these values to, for example, the data tabulated in Table 1, above. Table 1 includes data compiled by the inventor. This data includes correlations between measured relative humidity (% RH), measured temperature (Meas. Temp. in ° C.) and moisture density in grams per cubic meter (g/m³).

The controller 14 uses the determined relative humidity in the steps depicted in FIG. 9. Initially in step S40, the controller 14 determines whether or not the variable OldDryFlag (initialized in FIG. 3) is equal to one (1). If the variable OldDryFlag is not equal to one (1), operation moves to step S41. If the variable OldDryFlag is equal to one (1), then operation moves to step S44.

At step S41, the variable OldDryFlag is made equal to 1. This subsequently provides an indication that steps S41-S43 have already been executed during the moisture releasing operation. Next, at step S42, the variable TmpON is made equal to, for instance, 33° C. (or some other value sufficiently larger than the upper compressor threshold temperature in effect during the cooling operation). Next, at step 43, the variable TmpOFF is made equal to, for instance, 30° C. (or some other value sufficiently larger than the lower compressor threshold temperature in effect during the cooling operation). The initial values of TmpON and TmpOFF in steps S42 and S43 can vary from vehicle to vehicle. Therefore, in the logic presented in FIG. 9, the defined values of TmpON and TmpOFF are merely examples, and not intended to be permanently fixed during execution of the logic presented in FIG. 9.

Next, at step S44, the controller determines the moisture density at the evaporator 28 using the measured humidity at the evaporator 28 and the data in Table 1 above. Next at step S45, the controller 14 determines whether or not the moisture density of the air on the downstream side 34 of the evaporator 28 is greater than a predetermined moisture density threshold MDTHRSH. The variable MDTHRESH is a predetermined value based upon comfort levels, and modified in accordance with the overall design of the vehicle 10, the passenger compartment 16 and the capacity of the air conditioning system 12. At step S45, if the moisture density of the air on the downstream side 34 of the evaporator 28 is greater than a predetermined moisture density threshold MDTHRSH, then control moves to step S46. At step S45, if the moisture density of the air on the downstream side 34 of the evaporator 28 is not greater than the predetermined moisture density threshold MDTHRSH, then control moves to step S16 in FIG. 4.

At step 46, the variable TmpON is made equal to the current measured evaporator temperature (Evap Temp) minus 1 (measured in degrees Celsius), which ensures that the compressor 22 is cycled on immediately. Control then moves to step S47 where the variable TmpOFF is made equal to the variable TmpON minus a variable HYST. The variable HYST is a fixed variable that is pre-determined in order to ensure that the compressor cycles on for a minimum duration, relative to the TmpON value. For example, the variable HYST can be set equal to 3 degrees Celsius, or less, or some other temperature altogether. Thereafter, control moves to step S16 in FIG. 4.

FIG. 10 shows the response corresponding to the operations set forth in the steps depicted in FIG. 9. Specifically, upon termination of the cooling operation, the moisture density is determined. When the determined moisture density becomes greater than the predetermined threshold MDTHRSH, the variables TmpON and TmpOFF are redefined and the controller 14 cycles the compressor 22 on and off in accordance with the steps set forth in FIG. 4. The moisture releasing operation continues, step by step until the time interval COMPOFF has elapsed. The first iteration of the operation depicted in FIG. 9, yields a first set of control temperatures $TmpON_1$ and $TmpOFF_1$, as shown in FIG. 10. The second iteration of the operation depicted in FIG. 9, yields a second set of control temperatures $TmpON_2$ and $TmpOFF_2$, as shown in FIG. 10. Lastly, a final iteration N of the operation depicted in FIG. 9, yields a final set of control temperatures $TmpON_N$ and $TmpOFF_N$, as shown in FIG. 10.

As a result, the possibility of released moisture condensing on interior glass surfaces of the passenger compartment 16 of the vehicle 10 is reduced or eliminated. Further unpleasant aromas and/or excessive concentrations of moisture passing through the passenger compartment 16 are also reduced or eliminated as a result of operating the air conditioning system 12 in accordance with the moisture releasing operation. In each of the first and second embodiments, the controller 14 sets the compressor ON temperature (TmpON) and the compressor OFF temperature (TmpOFF) such that successive values of the compressor ON temperature and the compressor OFF temperatures are incremented by a predetermined amount after each cycling of the compressor on and off.

In the third embodiment, the moisture sensor MS is configured and arranged to measure moisture in airflow downstream from the evaporator 28. During the moisture releasing operation, the controller 14 sets the compressor ON temperature (TmpON) and the compressor OFF temperature (TmpOFF) in response to the moisture in the airflow downstream from the evaporator 28 being equal to or greater than the predetermined threshold MDTHRESH. However, in each of the embodiments described above, the cycling the compressor 22 on and off during a moisture releasing operation includes finite cycling of the compressor 22 in order to retard release of moisture from the heat transferring portions 30 of the evaporator 28.

The controller 14 preferably includes a microcomputer with an air conditioning system control program that controls the operation of the air conditioning system 12, as discussed above. The controller 14 can also include other conventional components such as an input interface circuit, an output interface circuit, and storage devices such as a ROM (Read Only Memory) device and a RAM (Random Access Memory) device. The memory circuit stores processing results and control programs such as ones for air conditioning system operation that are run by the processor circuit. The controller 14 is operatively coupled to the air conditioning system in a conventional manner. The internal RAM of the controller 14 stores statuses of operational flags and various control data, such as the variables described above. The internal ROM of the controller 14 stores the pre-determined variables and the various steps and logic associated with the above described operations. It will be apparent to those skilled in the art from this disclosure that the precise structure and algorithms for the controller 14 can be any combination of hardware and software that will carry out the functions of the present invention.

The various portions of the vehicle 10, other than the controller 14, are conventional components that are well known in the art. Since the various portions of the vehicle 10 are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the air conditioning system. Accordingly, these terms, as utilized to describe the present invention should be interpreted relative to a vehicle equipped with the air conditioning system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle air conditioning system comprising:

a compressor configured to compress refrigerant, the compressor being disposed within a vehicle;

a condenser fluidly coupled to the compressor to receive the refrigerant from the compressor;

an evaporator fluidly coupled to the condenser to receive the refrigerant from the condenser and fluidly coupled to the compressor to supply the refrigerant to the compressor; and a controller operatively coupled to the compressor to manage operation of the compressor during a cooling operation that provides temperature reduction of air flowing across heat transferring portions of the evaporator, the controller further configured to manage operation of the compressor in a moisture releasing operation in response to termination of the cooling operation when the vehicle continues to be operated, moisture releasing operation including finite operation of the compressor to retard release of moisture from the heat transferring portions of the evaporator and upon completion of the moisture releasing operation the controller ceases operating the compressor.

2. The vehicle air conditioning system according to claim 1, wherein the controller further manages operation of the compressor for a predetermined period of time after termination of the cooling operation during the moisture releasing operation.

3. The vehicle air conditioning system according to claim 1, further comprising an evaporator temperature sensor positioned to measure a temperature in an area proximate to the evaporator that is indicative of an evaporator temperature of the evaporator, and during the moisture releasing operation, the controller cycling the compressor on in response to the evaporator temperature being equal to or greater than an upper compressor threshold temperature, and further cycling the compressor off in response to the evaporator temperature being equal to or less than a lower compressor threshold temperature.

4. The vehicle air conditioning system according to claim 3, wherein
the controller progressively increases the upper compressor threshold temperature and the lower compressor threshold temperature during the moisture releasing operation.

5. The vehicle air conditioning system according to claim 3, wherein
the controller linearly increases the upper compressor threshold temperature and the lower compressor threshold temperature as a function of time during the moisture releasing operation.

6. The vehicle air conditioning system according to claim 3, wherein
the controller periodically increases the upper compressor threshold temperature and the lower compressor threshold temperature over a plurality of predetermined time intervals and holds the upper compressor threshold temperature and the lower compressor threshold temperature at respective predetermined and discrete values during each of the plurality of predetermined time intervals.

7. The vehicle air conditioning system according to claim 3, further comprising
a moisture sensor configured and arranged to measure moisture in airflow downstream from the evaporator, and
during the moisture releasing operation, the controller selectively cycles the compressor on in response to the moisture in airflow downstream from the evaporator being equal to or greater than a moisture threshold.

8. The vehicle air conditioning system according to claim 1, further comprising
an evaporator temperature sensor positioned to measure a temperature in an area proximate to the evaporator that is indicative of an evaporator temperature of the evaporator, and
during the moisture releasing operation, the controller cycling the compressor on in response to the evaporator temperature being equal to or greater than an upper compressor threshold temperature.

9. The vehicle air conditioning system according to claim 8, wherein
the controller progressively increases the upper compressor threshold temperature during the moisture releasing operation.

10. The vehicle air conditioning system according to claim 8, wherein
the controller linearly increases the upper compressor threshold temperature as a function of time during the moisture releasing operation.

11. The vehicle air conditioning system according to claim 8, wherein
the controller periodically increases the upper compressor threshold temperature over a plurality of predetermined time intervals and holds the upper compressor threshold temperature at a respective predetermined and discrete value during each of the plurality of predetermined time intervals.

12. A method for controlling operation of a vehicle air conditioning system, comprising
managing operation of a compressor in a vehicle during a cooling operation that provides temperature reduction of air flowing across surfaces of a heat transferring portion of an evaporator; and
managing operation of the compressor in a moisture releasing operation in response to termination of the cooling operation when the vehicle continues to be operated, the moisture releasing operation including finite operation of the compressor that retards release of moisture from the heat transferring portions of the evaporator and upon completion of the moisture releasing operation the controller ceases operating the compressor.

13. The method according to claim 12, wherein
the managing of operation of the compressor, during the moisture releasing operation, includes managing operation of the compressor for a predetermined period of time after termination of the cooling operation.

14. The method according to claim 12, further comprising
determining an evaporator temperature of an evaporator associated with the air conditioning system, and
the managing of operation of the compressor, during the moisture releasing operation, includes cycling the compressor on in response to the evaporator temperature being equal to or greater than an upper compressor threshold temperature and further cycling the compressor off in response to the evaporator temperature being equal to or less that a lower compressor threshold temperature.

15. The method according to claim 14, wherein
the managing of operation of the compressor, during the moisture releasing operation, includes progressively increasing the upper compressor threshold temperature and the lower compressor threshold temperature.

16. The method according to claim 14, wherein
the managing of operation of the compressor, during the moisture releasing operation, includes linearly increasing the upper compressor threshold temperature and the lower compressor threshold temperature as a function of time.

17. The method according to claim 14, wherein
the managing of operation of the compressor, during the moisture releasing operation, includes periodically increasing the upper compressor threshold temperature and the lower compressor threshold temperature over a plurality of predetermined time intervals and holding the upper compressor threshold temperature and the lower compressor threshold temperature at respective predetermined and discrete values during each of the plurality of predetermined time intervals.

18. The method according to claim 12, further comprising
determining moisture in airflow downstream from an evaporator associated with the air conditioning system, and
the managing of operation of the compressor, during the moisture releasing operation, includes selectively cycling the compressor on in response to the moisture in airflow downstream from the evaporator being equal to or greater than a moisture threshold.

19. The method according to claim 12, further comprising
determining an evaporator temperature of an evaporator associated with the air conditioning system, and
the managing of operation of the compressor, during the moisture releasing operation, includes cycling the compressor on in response to the evaporator temperature being equal to or greater than an upper compressor threshold temperature.

20. The method according to claim 19, wherein
the managing of operation of the compressor, during the moisture releasing operation, includes progressively increasing the upper compressor threshold temperature.

* * * * *